United States Patent [19]

Vencill et al.

[11] 4,221,420
[45] Sep. 9, 1980

[54] CAR AND BOAT TRAILER

[75] Inventors: Larry E. Vencill; Harold R. Cruse; William O. Conner, all of Richmond, Ky.

[73] Assignee: Car Cruise & Associates, Inc., Madison, Ky.

[21] Appl. No.: 892,212

[22] Filed: Mar. 31, 1978

[51] Int. Cl.² .............................................. B60P 3/08
[52] U.S. Cl. .................................. 296/1 A; 254/122; 280/414 R
[58] Field of Search .............. 280/414 R; 296/23 C, 296/23 B, 1 A; 214/85, 512; 105/368 R; 254/89 R, 122, 124, 9 C; 248/421

[56] References Cited

U.S. PATENT DOCUMENTS

| 2,931,519 | 4/1960 | Beach | 254/9 R |
| 3,909,057 | 9/1975 | Guthry | 280/414 R |
| 3,913,496 | 10/1975 | Lohr | 105/368 R |
| 3,989,265 | 11/1976 | Smiley | 280/414 R |
| 4,068,772 | 1/1978 | Prudhomme | 296/1 A X |

Primary Examiner—John J. Love
Assistant Examiner—Randall A. Schrecengost
Attorney, Agent, or Firm—Frailey and Ratner

[57] ABSTRACT

A trailer to be towed by a vehicle for transporting a car and a boat having a first support assembly adapted to carry the car. A second support assembly is adapted to carry the boat and is movable between a lower and raised position. Two pairs of pivoted scissor arms are slidably secured to opposite sides of the first and second support assemblies. Hydraulic actuators are used to actuate the scissor arm pairs thereby to move the second support assembly between its raised and lowered positions.

6 Claims, 9 Drawing Figures

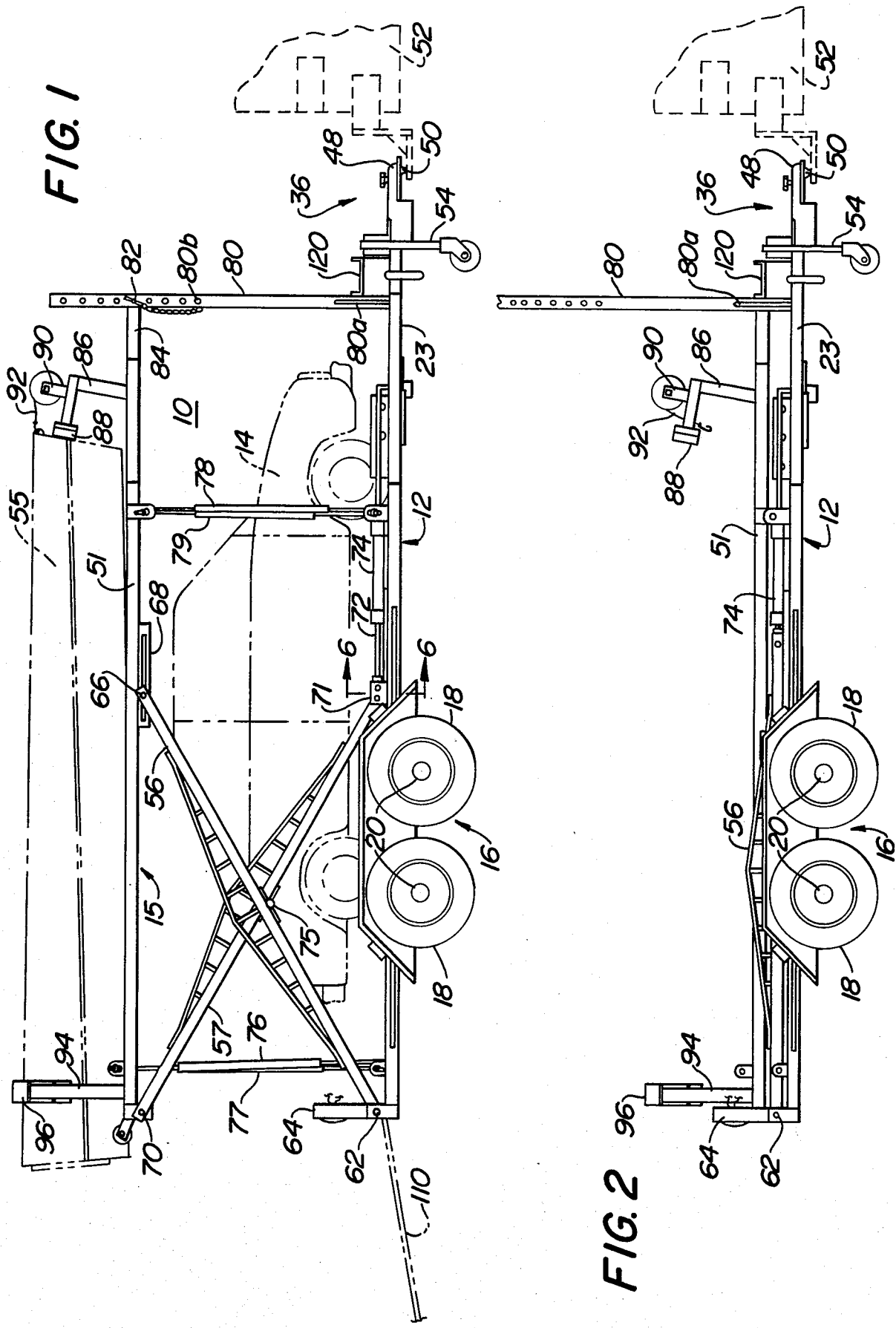

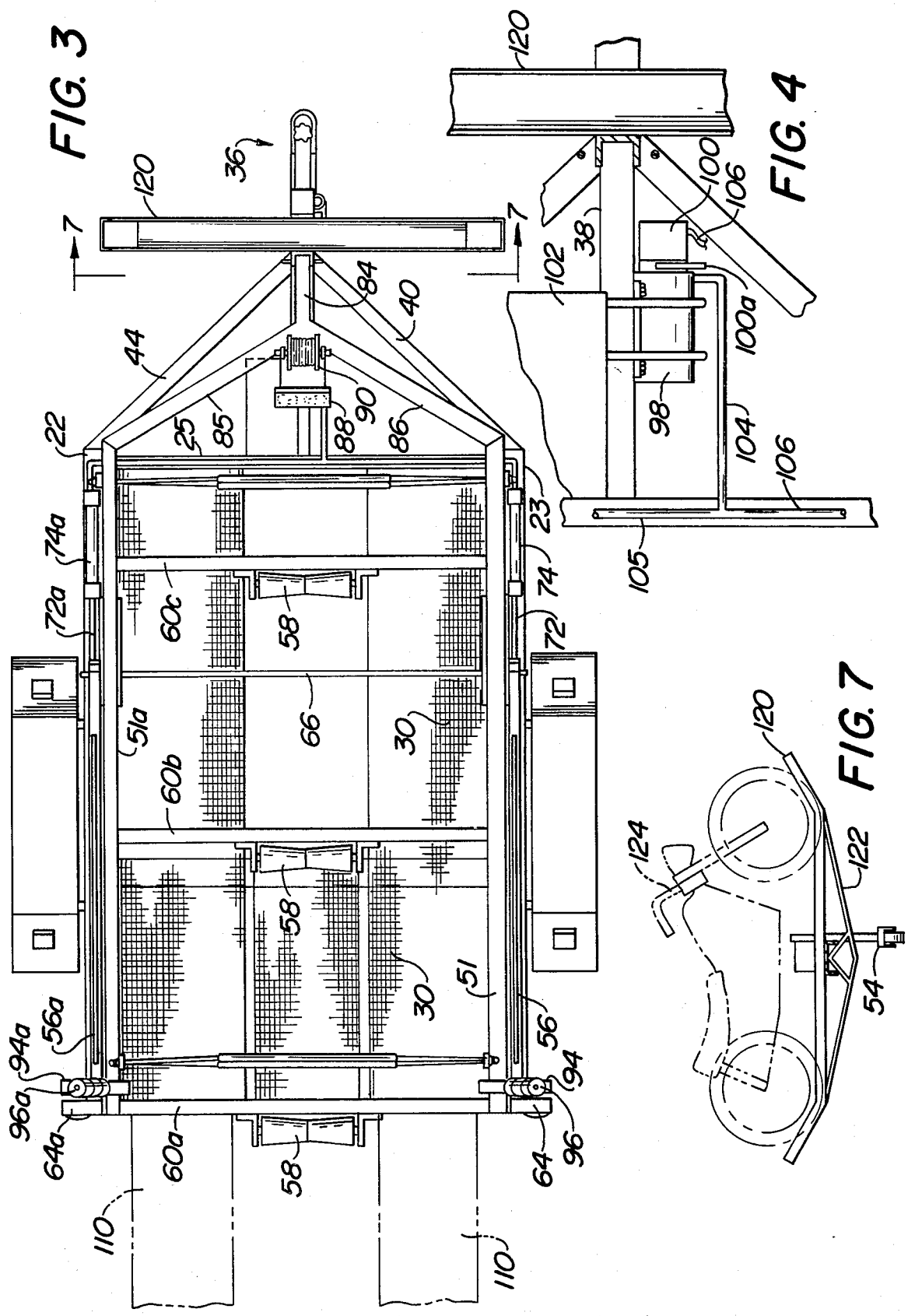

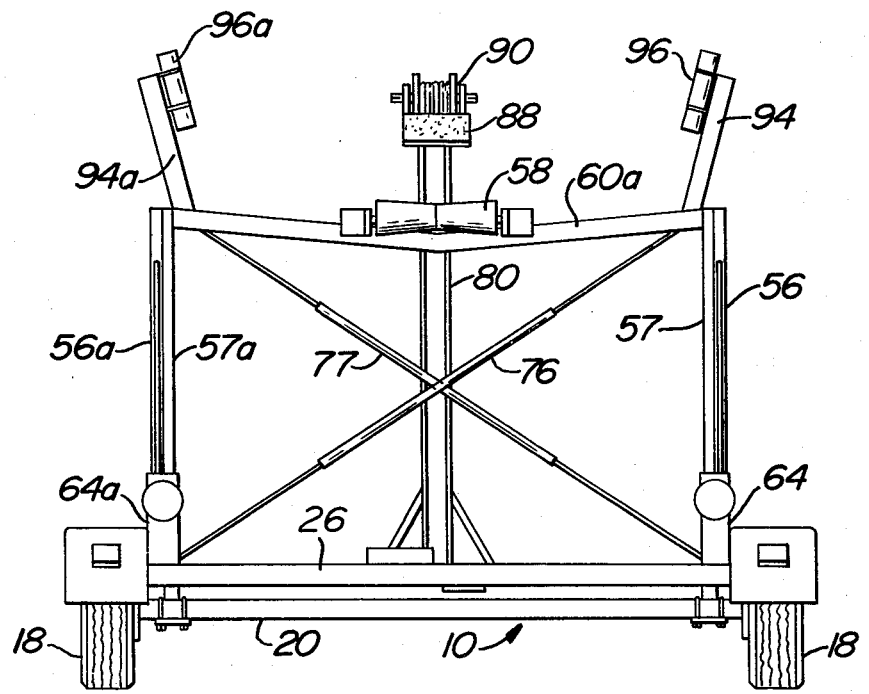
FIG. 5
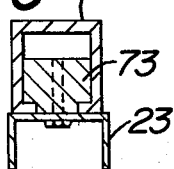
FIG. 6
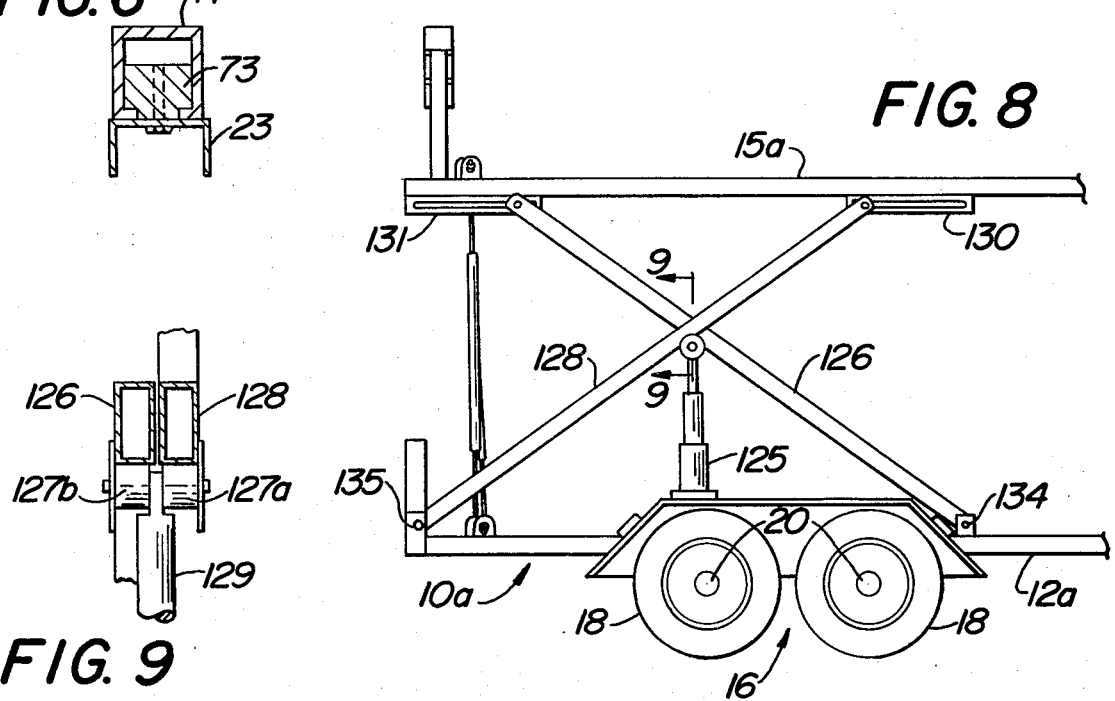
FIG. 8
FIG. 9

CAR AND BOAT TRAILER

BACKGROUND OF THE INVENTION

A. Field of the Invention

This invention relates to the field of art of trailers adapted to be towed by vehicles.

B. Prior Art

It has been known in the past to provide trailers which carry two boats, for example, and it has also been known to have trailers which carry a combination of a boat and a car. Examples of such trailers are described in U.S. Pat. Nos. 3,870,339 and 3,718,227. Many of these prior attempts have left much to be desired particularly when both an automobile and a boat was to have been towed. Such prior trailers lacked stability and structural integrity when, for example, the boat was in the raised position. Further, the raising of the boat has been cumbersome and could not be achieved simply and safely. In essence, the prior art lacked a simple but sturdy way to raise and lower the boat so that it would be safely towable.

SUMMARY OF THE INVENTION

A car and a boat trailer comprising a first support assembly adapted to carry the car and a second support assembly adapted to carry the boat. The second support assembly is movable from the lowered position immediately above the first support assembly to a raised position to provide clearance for the car between the assemblies. A first and second pair of pivoted scissor arms are slidably secured to opposing sides of the first and second support assemblies. Hydraulic means are coupled to the first and second scissor arm pairs for actuating the scissor arm pairs to move the second support assembly between the raised and lower positions.

BRIEF DESCRIPTION OF THE DRAWINGS

FIG. 1 is a side view of a car and boat trailer in the raised position in accordance with the invention;

FIG. 2 is a side view of the trailer of FIG. 1 shown in the lowered position without car and boat;

FIG. 3 is a top view of the trailer of FIGS. 1 and 2;

FIG. 4 is a cut-away view in more detail of FIG. 3 showing the hydraulic assembly;

FIG. 5 is an end view of the trailer of FIG. 1 without the car and boat;

FIG. 6 is a section taken on lines 6—6 of FIG. 1;

FIG. 7 is an end view showing a trail bike carrier, with a trail bike in phantom taken along lines 7—7 of FIG. 3; and FIGS. 8 and 9 show a further embodiment of the invention having a vertically disposed hydraulic actuator.

DETAILED DESCRIPTION

Referring now to FIGS. 1–3, there is shown a car and boat trailer 10 which comprises a first support assembly 12 which forms an automobile trailer for carrying an automobile 14. Assembly 12 is carried by a conventional tandem wheel assembly 16 which comprises wheels 18 and axles 20 with assembly 16 being attached to support assembly 12 in conventional manner. Assembly 12 is formed of left and right side longitudinally directed support members 22,23, front and rear transverse support members 25,26 and intermediate transverse support members 28. Grating 30 is disposed on the upper edges of members 22, 23, 25, 26 and 28 and may be secured in place as for example by welding. Assembly 12 is constructed so as to support automobile 14.

Hitching assembly 36 extends from the forward end of support assembly 12 and comprises a centrally disposed longitudinally extending member 38 having rearwardly extending supports 40 and 44. As shown, support strut 40 is secured to the forward end of side member 23 while support strut 44 is secured to the forward end of side member 22. At the forwardmost end of assembly 36, there is provided a socket joint connector 48 for receiving a hitching ball 50 secured in conventional manner to a towing vehicle 52. Further, a conventional landing gear support wheel assembly 54 may be provided to support trailer 10 when vehicle 52 is removed.

A second support assembly 15 supports a boat 55. Assembly 15 is formed of longitudinally directed side members 51,51a, transversely directed front and back members 53,53a and intermediate members 60a–c. Rollers 58 are rotatably secured to each of members 60a–c. Members 60a–c and rollers 58 are each "V" shaped in order to properly accommodate and support the bottom of the hull of boat 55.

Assembly 15 is effectively raised and lowered by two pairs of scissor arms (pantographs) 56,57 and 56a,57a. Each of the pairs of scissors arms are similar and therefore only one of them, viz, arm 56,57, need be described in detail. As shown, the arms may each be strengthened by means of bridging supports. One end of arm 56 is pivoted at 62 to an upright 64 extending from the rearmost end of support member 23. The other end of arm 56 has an extending pin 66 which is received within a transverse slot of a guide 68.

The other arm 57 of the pair, at one end is pivotally connected at 70 to the rearmost end of support member 51. The other end of arm 57 is pivotally secured to a slider 71 flexibly coupled to one end of a piston rod 72 of an hydraulic cylinder 74 fixedly secured at one end to member 23. As shown in FIG. 6, slider 71 slidably engages a "T" shaped guide 73 rigidly secured to member 23. Arms 56,57 are pivotally coupled to each other intermediate the ends thereof by a pivot assembly 75. Pair of arms 56a,57a are similarly pivotally coupled to support members 22,52a and to rod 72a of hydraulic cylinder 74a. In this manner, upon actuation of hydraulic cylinders 74,74a in a manner later to be described, arms 56,57 and 56a,57a respectively may be moved between their fully retracted or lowered position shown in FIG. 2 and their extended position shown in FIG. 1.

In the extended position shown in FIG. 1, support assembly 15 is rigidly secured in place for firm support of boat 55 by means of arms 56,57, 56a and 57a four stabilizing bars 76–79 and upright support 80. As shown, bars 76 and 78 extend between openings in respective ears secured to members 22 and 51. Similarly, bars 77 and 79 extend between openings in ears secured to members 23 and 51a. Further bars 76–79 each have a turnbolt for use in adjusting the length of the respective bar.

Upright 80 is secured at its lower end to member 38 by means of supports 80a. Upright support 80 has stop holes 80b spaced over an upper end section thereof for receiving a pin 82 which engages a corresponding opening in a member 84 extending longitudinally from the forward end of support assembly 15. Supports 85 and 86 are secured to member 84 and to the forward ends of side members 51a, 51 respectively. In this manner, second support assembly 15 is rigidly secured in place by means of upright 80, bars 76–79 and scissor arms 56, 57, 56a and 57a.

A trail bike carrier 120 is secured between assembly 54 and upright 80 and is effective to provide further support for the upright. Carrier 120 is formed of a metal U shaped channel which at its ends is bent upwardly to receive and support the wheels of a trail bike 124. Carrier 120 has a lower structural assembly 122 secured to support assembly 12 which provides further structural integrity to the carrier.

As best shown in FIGS. 1 and 3, a winch and support assembly 86 is secured to member 84 and provides a nose support section 88 and a hand winch 90. Winch 90 has a cable 92 for pulling boat 55 onto support assembly 15 in conventional manner. In addition, support arms 94,94a having respective rollers 96,96a are provided to aid in the loading of boat 55 as well as securing the boat in place on the road. Support arms 94,94a are respectively secured to arms extending from end sections of support members 51,51a.

Hydraulic cylinders 74,74a are actuated by means of an hydraulic pump 98 operated by an electric motor 100. Pump 98 is secured to the side of member 38 and is coupled to a source of hydraulic fluid from a tank 102 and to cylinders 74,74a by means of lines 104–106. In conventional manner, motor 100 is electrically connected by means of wires 106 to a battery in vehicle 52 and motor 100 may be actuated by a lever 100a for forward, reverse and stop.

In operation, car and boat trailer 10 may be transported by vehicle 52 in the lowered or folded state shown in FIG. 2 when no automobile is being carried and a boat 55 may be carried if desired. If both an automobile and a boat are to be transported, the following steps are taken. Trailer 10 is first maintained in the position shown in FIG. 2 and winch 90 is used to load boat 55 in conventional manner. With the boat fully loaded and secured, lever 100a of motor 100 is operated to raise support assembly 15 to extended position of desired height as for example as shown in FIG. 1. Pin 82 is inserted into upright 80 and member 84 at that desired position, an automibile 14 is then driven onto support assembly 12 by means of platform tracks 110. Automobile 14 is secured in place in conventional manner and bars 76–79 are attached so that trailer 10 is in condition to be transported by vehicle 52. Further, a trail bike 124 may be carried within carrier 120 so that in operation, trailer 10 is effective to carry a car 14, a boat 55 as well as a trail bike 124.

Another embodiment of the invention is shown in FIG. 8 in which all of the elements of a trailer 10a are the same as that of trailer 10 except for the operation and structure of right and left scissor arm pairs with each pair having an associated hydraulic cylinder. Since the right scissor arm pair 126, 128 and cylinder 125 are identical to those on left, only those on the right will be described. Trailer 10a is adapted for use with heavier boats than those carried by trailer 10 by the provision of a vertically mounted hydraulic cylinder 125 instead of horizontal cylinder 74.

Specifically, arm 128 is pivoted at a fixed support 135 of first assembly 12a and has its other end slidably received within a slide guide 130 secured to second support assembly 15a. Similarly, the other arm 126 is pivoted at support 134 and has its other end slidably received within a slide guide 131. Hydraulic cylinder 125 has its lower end secured to support assembly 12 with rod 129 extending from the other end of the cylinder. Wheels 127a, b are rotatably attached to the free end of rod 129 with the wheels slidably engaging the lower sides of supports 128, 126. Accordingly, when hydraulic cylinder 125 is actuated by means of hydraulic pump 98, previously described, cylinder rod 129 is effective to push arms 126, 128 upwardly and thereby raising support assembly 15a to the raised position as shown in FIG. 8.

What is claimed is:

1. A trailer for transporting a single car and a single boat comprising
   a first support assembly adapted to carrying said car,
   a second support assembly adapted to carrying a boat movable from a lower position immediately above said first support assembly to a raised position above said first support assembly to provide clearance for said single car,
   a first and a second pair only of pivoted scissor arms slidably secured to opposing sides of said first and second support assemblies,
   hydraulic means coupled only to said first and second scissor arm pairs for actuating said scissor arm pairs to move said second support assembly between the raised and lowered position whereby solely said hydraulic means and said first and second scissor arm pairs are effective to move said second support assembly between said positions,
   an upright support releasably secured to said second support assembly when in the raised position to provide support to said second support assembly, said upright support being fixedly secured to said first support assembly adjacent one end of said trailer, and said first and second pair of scissor arms being disposed adjacent the opposing end of said trailer thereby to provide support for the raised second support assembly at said ends of said trailer.

2. The trailer of claim 1 in which said hydraulic means comprises only first and second horizontally disposed hydraulic assemblies coupled respectively only to said first and second pairs of scissor arms.

3. The trailer of claim 1 in which there are provided further support members releasably coupled between said first and second support assemblies with the second support assembly in the raised position to provide further support for towing of said boat.

4. The trailer of claim 3 in which each of said hydraulic cylinders is coupled to a respective scissor arm extending towards the front of said trailer.

5. The trailer of claim 4 in which there is provided a trail bike carrier secured to the front end of said trailer for additionally carrying a trail bike.

6. A trailer for transporting a car and a boat comprising
   a first support assembly adapted to carrying said car,
   a second support assembly adapted to carrying a boat movable from a lower position immediately above said first support assembly to a raised position above said first support assembly to provide clearance for said car,
   a first and a second pair of pivoted scissor arms slidably secured to opposing sides of said first and second support assemblies, and
   hydraulic means coupled to said first and second scissor arm pairs for actuating said scissor arm pairs to move said second support assembly between the raised and lowered position said hydraulic means comprises first and second vertically disposed hydraulic actuators for said first and second pairs of scissor arms, each of said hydraulic actuators having an associated rotating assembly for engaging bottom edges of the respective pair of scissor arms.

* * * * *